UNITED STATES PATENT OFFICE.

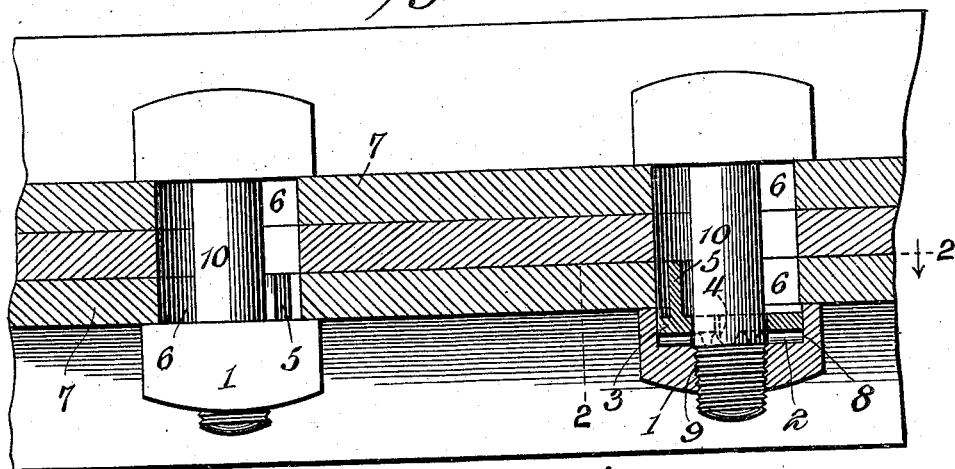
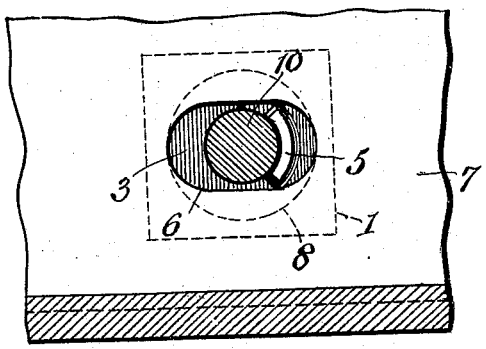
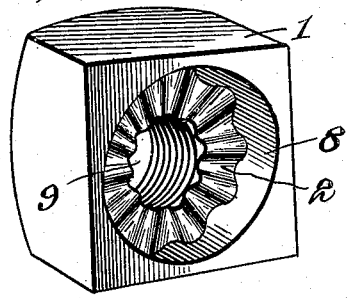

THOMAS M. MILLS, OF SAN ANTONIO, TEXAS.

NUT-LOCK.

No. 924,259.

Specification of Letters Patent.

Patented June 8, 1909.

Application filed May 27, 1908. Serial No. 435,280.

*To all whom it may concern:*

Be it known that I, THOMAS M. MILLS, a citizen of the United States, residing at San Antonio, in the county of Bexar and State of Texas, have invented a new and useful Nut-Lock, of which the following is a specification.

The invention relates to improvements in nut locks.

The object of the present invention is to improve the construction of nut locks, and to provide a simple and comparatively inexpensive one designed particularly for use on rail joints, and capable of effectually preventing the nuts of the bolts of rail joints from accidentally unscrewing, and adapted to permit the said nuts to be readily removed and replaced, when desired, without injuring the locking mechanism.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a horizontal sectional view of a portion of a rail joint provided with a nut lock, constructed in accordance with this invention. Fig. 2 is a vertical sectional view, taken substantially on the line 2—2 of Fig. 1. Fig. 3 is a detail perspective view of the nut. Fig. 4 is a detail view of the locking ring.

Like numerals of reference designate corresponding parts in all the figures of the drawing.

The nut lock, which is designed particularly for use on rail joints, comprises a nut 1 having a ratchet face 2 and a split locking ring 3, provided with a lug 4 for engaging the ratchet face of the nut and having a flange 5, arranged to fit within the elliptical opening 6 of a fish plate 7, whereby the locking ring is held against rotary movement. The nut is provided at its inner face with an annular recess 8, surrounding the threaded bolt opening 9 and the ratchet face 2, which is arranged within the recess between the bolt opening 9 and the wall of the recess, is formed by radially tapered corrugations and consists of rounded lugs and intervening curved grooves.

The lug 4, which is arranged at one end of the split locking ring, extends outwardly and is rounded and tapered radially to conform to the configuration of the corrugations of the ratchet face of the nut, and it is adapted to interlock with the same with sufficient force to effectually prevent the nut from accidentally unscrewing, and at the same time it is adapted to permit the nut to be readily unscrewed with a wrench without injuring the locking mechanism. By this construction the nut may be readily placed on or removed from the bolt 10.

The flange 5, which extends inwardly from the locking ring, is curved transversely to conform to the configuration of the bolt, and it tapers transversely from the inner face of the locking ring. The inner face of the curved flange is arranged in flush relation with the inner periphery or edge of the locking ring, and the flanged side edges of the tapered flange are adapted to abut against the opposite side walls of the elliptical opening 6 of the fish plate, whereby the ring is held stationary. The nut has a smooth flat face surrounding the recess, which wholly receives the locking ring so that the latter is not interposed between the inner face of the nut and the fish plate, and will not be crushed by the clamping action of the nut. Furthermore, as the depth of the recess is greater than the thickness of the locking ring, the resiliency of the latter is not impaired by the said clamping action of the nut. By constructing the curved flange 5 in this manner, the locking ring is interlocked with the fish plate by means of the usual oblong or elliptical openings, and it is not necessary to provide a special construction on the fish plate to coöperate with the locking washer to effect this result.

Although the nut lock is especially designed for use on rail joints having fish plates, equipped with elliptical openings, yet it will be readily apparent that the nut lock is applicable to various constructions requiring lock nuts, such as bridges, machines, cultivators, plows, etc., and the flange 5 of the split locking ring will engage a suitable opening in the surface or part against which the locking ring is placed.

Having thus fully described my invention, what I claim as new and desire to secure by Letters Patent, is:—

1. In a nut lock, the combination with a fish plate having an oblong opening, and a bolt, of a nut provided in its inner face with a recess and having a flat engaging surface surrounding the recess, the latter being provided with a ratchet face, and a split locking ring located wholly within the recess to permit the inner face of the nut to engage the fish plate and provided with a projecting lug to engage the ratchet face of the nut, said locking ring having an inwardly extending flange fitting within the oblong opening of the fish plate, whereby the locking ring is held against rotary movement.

2. A nut lock including a nut provided in its inner face with a cylindrical recess and having a flat engaging surface surrounding the same, said recess being provided with a series of radially tapered corrugations surrounding the bolt opening and forming rounded ribs and intervening curved grooves, and a split locking ring provided at one end with a rounded lug tapered transversely of the locking ring to engage the tapered ribs and grooves, said locking ring being of a thickness less than the depth of the recess and located wholly within the same and provided at its other end with an inwardly extending tapered flange curved transversely to conform to the configuration of a bolt and extending in the opposite direction from the lug and arranged to project into the opening in the surface against which the locking ring is placed.

In testimony, that I claim the foregoing as my own, I have hereto affixed my signature in the presence of two witnesses.

THOMAS M. MILLS.

Witnesses:
CARRIE A. ROSS,
C. L. BASS.